United States Patent
Fünfschilling et al.

[19]
[11] Patent Number: 5,841,504
[45] Date of Patent: *Nov. 24, 1998

[54] DISTORTED HELIX FERROELECTRIC LIQUID CRYSTAL CELL

[75] Inventors: Jürg Fünfschilling, Basel; Martin Schadt, Seltisberg, both of Switzerland

[73] Assignee: Rolic AG, Basel, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 741,451

[22] Filed: Oct. 31, 1996

Related U.S. Application Data

[63] Continuation of Ser. No. 504,984, Jul. 20, 1995, abandoned, which is a continuation of Ser. No. 241,096, May 11, 1994, abandoned.

[30] Foreign Application Priority Data

May 19, 1993 [CH] Switzerland ............... 1527/93

[51] Int. Cl.$^6$ .............. G02F 1/13; G02F 1/1343
[52] U.S. Cl. .............. 349/172; 349/184; 349/38
[58] Field of Search ............... 349/172, 184, 349/38

[56] References Cited

U.S. PATENT DOCUMENTS

| | | | |
|---|---|---|---|
| 4,241,984 | 12/1980 | Leibowitz | 349/161 |
| 4,738,515 | 4/1988 | Okada et al. | 349/133 |
| 4,838,663 | 6/1989 | Lagerwall et al. | 349/117 |
| 4,904,604 | 2/1990 | Kivlen . | |
| 4,952,335 | 8/1990 | Furukawa et al. . | |
| 5,153,775 | 10/1992 | Higa . | |
| 5,473,449 | 12/1995 | Takemura et al. . | |

FOREIGN PATENT DOCUMENTS

| | | |
|---|---|---|
| 234 429 | 9/1987 | European Pat. Off. . |
| 356 730 | 7/1989 | European Pat. Off. . |
| 54-155795 | 12/1979 | Japan . |
| 62-124525 | 6/1987 | Japan . |
| 62-189431 | 8/1987 | Japan . |

OTHER PUBLICATIONS

U.S. application No. 07/243,756, Beresnev et al., filed Sept. 13, 1988.
Derwent Abstract No. AN–90–068584/10.
Fünfschilling, J., et al., Japanese Journal of Applied Physics, Part 1 (Regular Papers & Short Notes), 33(9A):4950–4959 (1994).
Fünfschilling, J., et al., Journal of Applied Physics, 66 (8):3877–3882 (1989).
Beresnev, L. A., Liquid Crystals, 1989, vol 5, No. 4, 1171–1177.

*Primary Examiner*—William L. Sikes
*Assistant Examiner*—Julie Ngo
*Attorney, Agent, or Firm*—Bryan Cave LLP

[57] ABSTRACT

A distorted helix ferroelectric liquid crystal cell (DHF) is driven with a capacitance connected in series to the liquid crystal layer. Capacity is effected by either an external device (capacitor) or by incorporation of a insulator (dielectric) in the DHF cell. The value of the series capacity is typically smaller than about twice the capacity of the cell without the series capacitance. The capacitive drive circuit, DHF cell and method for driving the circuit and cell, function to shorten the switching times required by conventional cells.

4 Claims, 1 Drawing Sheet

DISTORTED HELIX FERROELECTRIC LIQUID CRYSTAL CELL

This is a continuation of application Ser. No. 08/504,984, filed Jul. 20, 1995 now abandoned, and Ser. No. 08/241,096 filed May 11, 1994 abandoned.

FIELD OF THE INVENTION

The invention relates to liquid crystal cells of the type known as distorted helix ferroelectric (DHF), and to a circuit and method suitable for this purpose.

BACKGROUND OF THE INVENTION

It is known to reduce switching times in DHF cells through the use of special driving pulse shapes (see for example, EP-A356 730, which corresponds to U.S. patent application Ser. No. 08/915,043, filed Jul. 16, 1992, the contents of which are herein incorporated by reference).

Operation via special driving pulse shapes permits not only gray scale values typical of DHF cells, but also allows multiplexing in combination with an active matrix. The DHF cell's relatively short switching time is advantageous in the industrial application of liquid crystal cells, e.g. in switchable filters, light valves (so-called spatial light modulators "SLMs") or 3D-spectacles. However, there exists a great need for even shorter switching times in liquid crystal cells.

Unexpectedly, it has now been found that switching times can be reduced by a factor of 10 through the use of a novel driving circuit which drives a cell via a capacitance connected thereto in series. As a result, high switching speed with simultaneous availability of gray scale values is obtained.

In the liquid crystal cell of the present invention a novel circuit is employed. This circuit is characterized in that its capacitance is smaller than the capacitance of the liquid crystal helix in series with the liquid crystal cell.

In a particularly preferred embodiment of the invention, the additional capacitance takes the form of a transparent insulating layer located between the driving electrodes and adjacent to the liquid crystal. Times thus achievable are shorter than times for comparable DHF cells which are directly driven by square-wave pulses. The driving voltage is preferably higher than previous conventional driving voltages. In this mode of operation higher voltage can be used without damaging (i.e. unwinding) the helical structure of the liquid crystal.

In contrast to a Lagerwall cell (see U.S. Pat. No. 4,904,064, issued Feb. 27, 1990, the contents of which are herein incorporated by reference), the inventive cell allows for the display of gray scales. Consequently, any desired deformation (i.e. alteration of transmission) of the cell can be achieved by a suitable choice of the amplitude. Moreover, electrochemically induced degradation of the liquid crystal is avoided, since the insulating layer prevents direct current from flowing in the cell.

The inventive cell can be used in display cells, including television sets and so-called terminals, in printers (a replacement for laser printers), and generally in all cases where high-speed light modulators or modulators with gray scales can be used. Thus, the inventive cell represents a major improvement over the prior art.

SUMMARY OF THE INVENTION

The subject distorted helix ferroelectric liquid crystal cell comprises two transparent substrates (each having an associated electrode and orientation means), capacitance means, and a liquid crystal layer disposed between the two substrates. The substrates, capacitance means and liquid crystal layer are coupled so that the capacity of the cell is electrically in series with the liquid crystal layer and smaller than the effective capacity of the cell without the series capacity. As used herein, the term "effective capacity" refers to capacity which includes the contribution of the ferroelectric helix. The term "smaller" is used as a comparative term. Quantitatively, it is preferred that the capacity of the cell is smaller than F times the effective capacity of the cell without the series capacity, and F ranges from about 3 to about 0.3. More preferably, F is from about 1 to about 0.3, and particularly about 0.3.

Capacitance means preferably comprise one or more insulating layers located between an electrode and the liquid crystal layer. However, insulating layers may also be located between each electrode and the liquid crystal layer. Alternatively, capacitance means may comprise a capacitor connected to one of the electrodes. Generally, the two substrates are parallel to each other and are spaced about 2 $\mu$m apart.

The orientation means generally comprise a polymer layer that is treated so as to orient the liquid crystal molecules in a predetermined orientation. Typical polymer layers include polyvinyl alcohol and polyimide, and a typical treatment involves rubbing.

Orientation means may comprise a polarizer which is parallel to or at an angle to the helical axis of the liquid crystal. For example, an angle of about 22.5° to the helical axis of the liquid crystal may be utilized.

BRIEF DESCRIPTION OF THE FIGURES

A preferred embodiment of the invention will now be described with reference to the accompanying drawings.

DETAILED DESCRIPTION OF THE INVENTION

The subject invention will now be described in terms of its preferred embodiments. These embodiments are set forth to aid in understanding the invention, but are not to be construed as limiting.

Figure 1:
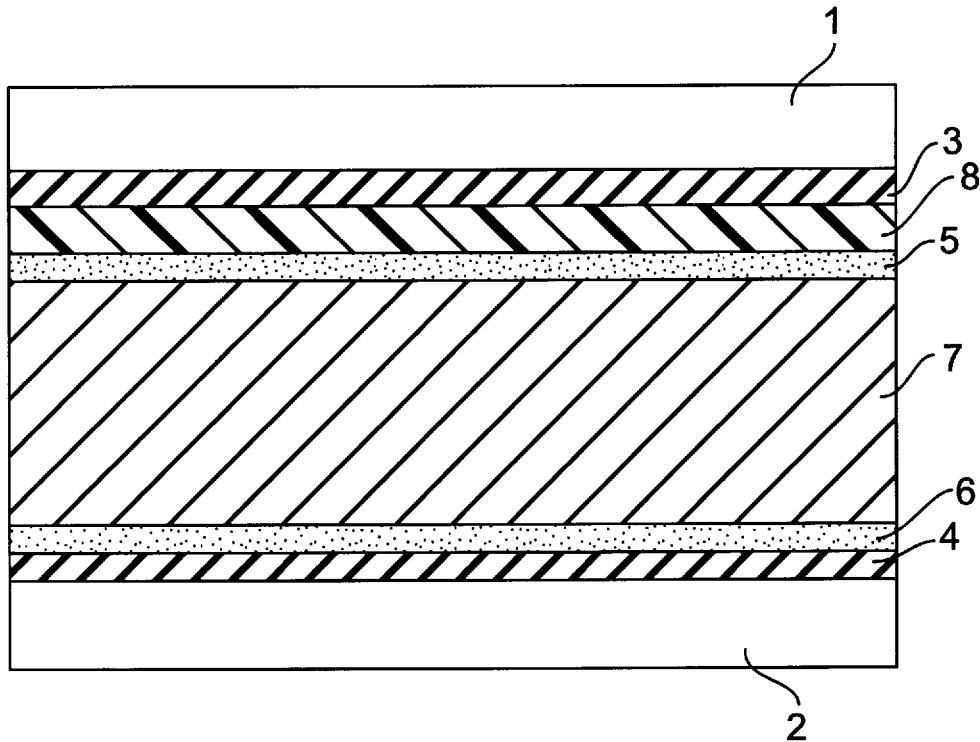
FIG. 1 is a schematic representation of a DHF cell in section.

The liquid crystal cell shown schematically in section in FIG. 1 is a distorted helix ferroelectric (DHF) cell as described in Swiss Patent Application No. 1555/88, dated 26 Apr. 1988, corresponding to U.S. patent application Ser. No. 08/200,939, filed Feb. 23, 1994, the contents of which are herein incorporated by reference. The liquid crystal cell has two parallel substrates (e.g. glass plates 1, 2) spaced apart by about 2 $\mu$m, and is provided with electrode layers 3, 4 on its facing surfaces. Plates 1, 2 also have on their facing surfaces polyvinyl alcohol (PVA) coatings 5, 6 which are treated (e.g. by rubbing) so as to orient the liquid crystal molecules in a preferred direction. Such treatment is known to the skilled artisan. Liquid crystal layer 7 is disposed between plates 1, 2.

In the one preferred embodiment, the liquid crystal comprises a mixture of:

13.1 wt. % of 5-nonyl-2-[p-(nonyloxy)phenyl] pyrimidine, 21.9 wt. % of 2-[p-(hexyloxy)phenyl]-5-nonylpyrimidine, 4.4 wt. % of 2-[p-[(E)-2-octenyloxy]phenyl]-5-octylpyridine, 8.8 wt. % of 2-(p-heptylphenyl)-5-[(E)-2-octenyloxy]pyrimidine, 8.8 wt. % of 5-[(E)-2-decenyloxy]-2-(p-heptylphenyl) pyrimidine, 4.4 wt. % of (E)-5-heptyl-2-(4-oct-2-enyloxy-phenyl) pyridine, 9.3 wt. % of 2,2'-(4,4'-biphenylene)bis[(2S,4S,5S)-4-methyl-5-octyl-m-dioxan] and 29.3 wt. % of bis[(R)-1-methylheptyl] p-terphenyl-4,4"dicarboxylate.

Insulating layer 8 is disposed on one of the two glass plates 1, 2 between electrode layer 3 and oriented (PVA) layer 5, and constitutes a dielectric of a capacitance which lies in series with the capacitance of liquid crystal layer 7. Alternatively, the cell can be driven using a commercially obtainable capacitor connected in series with the cell. Such an alternative drive can be used in place of the capacitance integrated in the liquid crystal layer.

Figure 2:
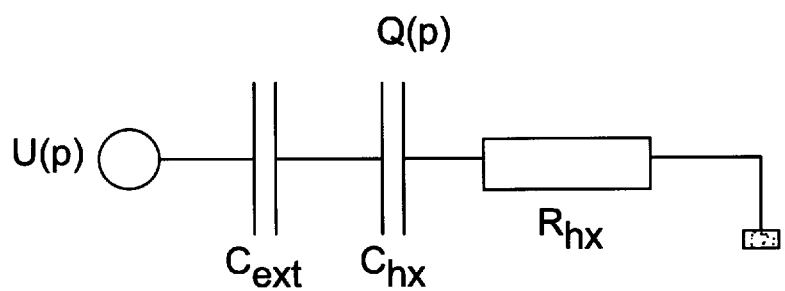
FIG. 2 is an alternative circuit diagram of the cell according to the invention.

In the alternative inventive cell circuit diagram shown in FIG. 2, the subscript hx denotes a parameter of the liquid crystal layer. The electro-optical effect of the DHF cell is brought about by deformation of a ferroelectric helix. This deformation is coupled with a charge (polarization charge) on the helix. The charge $Q_{hx}$ is therefore a measure of the deformation of the helix and consequently of the electro-optical effect. The fact that an applied voltage deforms the helix can be described by introducing a capacitance $C_{hx}$ which is charged when a voltage is applied. The viscosity of the liquid crystal is thus described by a series resistance ($R_{hx}$). The series resistance of the ITO layer is also present in $R_{hx}$.

The electro-optical effect $f_{eo}$ ($Q_{hx}$) is therefore only a function of $Q_{hx}$. This model leads to a frequency dependence for $Q_{hx}$ of the following form:

$$Q_{hx}(p) = C_{hx} \frac{U(p)}{pR_{hx}C_{hx} + 1} \quad (1)$$

where p=j ω, ω=frequency, j=imaginary unit.

The frequency behavior of $f_{eo}$ therefore corresponds to that of an RC element with a characteristic time $\tau_{hx}=R_{hx}C_{hx}$. The electro-optical effect follows the applied voltage up to the cut-off frequency of the RC element.

If an additional capacitance $C_{ext}$ is connected in series with the cell, then $C_{hx}$ in formula (1) must be replaced by C, the capacitance of the series connection of $C_{hx}$ and $C_{ext}$:

$$C=C_{hx}C_{ext}/(C_{hx}+C_{ext}) \quad (2)$$

The new characteristic time is therefore $\tau=R_{hx}$ C. Since C is always smaller than $C_{ext}$, this time can be made very short for small values of $C_{ext}$. Since the extent of the electro-optical effect is also proportional to C (equation 1), the lower time is limited ultimately by the highest voltage which can be applied without damaging the cell.

No direct current voltage component can be applied to capacitively-coupled liquid crystal cells. This is very desirable since no space charges are separated in the liquid crystal cell, thus averting any possible adverse effect on orientation, stability or working point (ghost images). Two modes of operating a DHF cell can be distinguished, depending upon the chosen position of the crossed polarizers relative to the helix. In both modes, dc-free driving is possible within limitations:

If a polarizer is parallel to the helical axis, then light transmission is at a minimum when a zero voltage (0 V) is applied to the liquid crystal cell. For both positive and negative voltages, light transmission is greater. Accordingly, if the liquid crystal cell is driven alternately positively and negatively, the average voltage at the liquid crystal cell will be zero. Thus, in the case of a television image, a positive and a negative image can be recorded in alternation. Unfortunately, a disadvantage of this method is that the useful electro-optical effect is halved.

If a polarizer is rotated through a fixed angle (preferably 22.5°) to the helical axis, light transmission is at a minimum, e.g. at a given negative voltage $U_-$ and at a maximum for a positive voltage $U_+$. To guarantee dc-free driving, therefore, $U_+t_+$ must equal $U_-t_-$, $t_+$, $_-$ denoting the times during which the positive and, respectively, negative voltage is applied. This mode of operation is therefore particularly suitable for applications having a constant scanning ratio, such as occurring with serially connected filters or spectacles for watching stereo images on a screen where the left and right images are presented in alternation.

The advantages of the inventive driving method include short switching time, absence of a dc current across the cell, substantially simpler driving (since no decomposition of the driving pulses in switching pulses and holding pulses is necessary), and inherent protection by isolation from short circuits. These advantages are in addition to the known advantages of DHF cells regarding the ability to generate gray scales, thin cells with little dependence on the angle of viewing, and combination with active addressing.

Upon reading the present specification, various alternative embodiments will become obvious to those skilled in the art. These embodiments are to be considered within the scope and spirit of the subject invention which is only to be limited by the claims which follow and their equivalents.

What is claimed is:

1. A distorted helix ferroelectric liquid crystal cell which comprises:

(a) two transparent substrates, each substrate having an electrode and orientation means;

(b) capacitance means; and (c) a liquid crystal layer disposed between the two substrates; wherein the substrates, capacitance means and liquid crystal layer are coupled so that the capacitance means is electrically in series with the liquid crystal layer and wherein the series capacitance is smaller than the effective capacitance of the cell without the series capacitance.

2. The cell of claim 1, wherein the capacitance means comprise an insulating layer located between an electrode and the liquid crystal layer.

3. A distorted helix ferroelectric liquid crystal cell, which comprises:

(a) two transparent substrates, each substrate having an electrode and orientation means;

(b) capacitance means; and (c) a liquid crystal layer disposed between the two substrates;

the substrates, capacitance means and liquid crystal layer being coupled so that the capacitance means is electrically in series with the liquid crystal layer and the capacitance of the cell is smaller than about 0.3 times the effective capacitance of the cell without the series capacitance.

4. A cell according to claim 3 wherein the capacitance means comprise an insulating layer located between an electrode and the liquid crystal layer.

* * * * *